Nov. 12, 1968  H. FRUTSCHI  3,410,091
NUCLEAR THERMAL POWER PLANT
Filed Aug. 16, 1965  3 Sheets-Sheet 1

INVENTOR
HANSULRICH FRUTSCHI

BY  *Dodge and Sons*

ATTORNEYS

Nov. 12, 1968       H. FRUTSCHI       3,410,091
           NUCLEAR THERMAL POWER PLANT
Filed Aug. 16, 1965                3 Sheets-Sheet 3

INVENTOR
HANSULRICH FRUTSCHI

BY  *Dodge and Sons*

ATTORNEYS

United States Patent Office 3,410,091
Patented Nov. 12, 1968

3,410,091
NUCLEAR THERMAL POWER PLANT
Hansulrich Frutschi, Zurich, Switzerland, assignor to Escher Wyss Aktiengesellschaft, Zurich, Switzerland, a a corporation of Switzerland
Filed Aug. 16, 1965, Ser. No. 479,752
Claims priority, application Switzerland, Oct. 7, 1964, 13,018/64; Nov. 5, 1964, 14,317/64
5 Claims. (Cl. 60—59)

ABSTRACT OF THE DISCLOSURE

Closed circuit gas turbine power plants utilizing heat generated in a nuclear reactor. Partial transfer of heat from the reactor to the gaseous working medium is effected by passing partially or fully expanded working medium through the reactor. Additional heat transfer is effected by passing compressed or partially expanded working medium through one path of a surface heat exchanger which is located outside the reactor and which is provided with a second path through which working medium leaving the reactor is diverted back to the reactor inlet.

---

Figure 1:
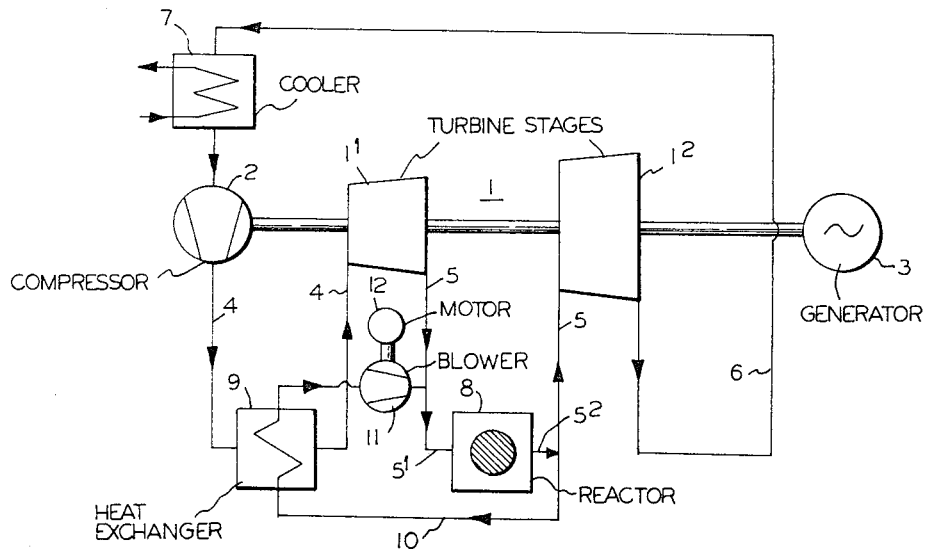

This invention relates to a gas turbine plant for utilizing the heat generated in a nuclear reactor, more particularly having a closed circuit for the working medium with a compressor, a turbine having at least one stage group, and two or more heaters, through which the working medium flows.

In a known steam-turbine plant, the working medium is heated on two separate routes passing through the nuclear reactor. On the first route, the live steam to be fed to the turbine is generated, while the second route serves for the intermediate superheating of the already partly expanded working medium. In such an arrangement, the partitions necessary in the nuclear reactor between the two routes give rise to considerable difficulties.

In a gas turbine plant, it is the object of the invention to avoid this drawback. In a gas turbine plant of the hereinbefore described kind, for this purpose according to the invention, one of the heaters through which the working medium flows is the nuclear reactor, and at least one of the further heaters is a surface heat exchanger which, on the heat supply side, lies in a return conduit, branching off the working medium conduit leading away from the nuclear reactor and opening into the working medium conduit leading to the nuclear reactor, a pumping device being provided for returning a working medium partial stream through the return conduit from the nuclear reactor outlet side to the nuclear reactor inlet side.

Constructional examples of the subject of the invention are illustrated in simplified manner in the drawing.

FIGS. 1 to 5 show diagrams of gas turbine plants with closed circuit of the gaseous working medium.

The plant shown in FIG. 1 has a gas turbine 1 with two expansion stages, namely the turbine stage groups $1^1$ and $1^2$, lying on the same shaft as a compressor 2 and an electric generator 3. The working medium flows in a working medium conduit 4 from the compressor 2 to the stage group $1^1$, in a working medium conduit 5 from the stage group $1^1$ to the stage group $1^2$, and in a working medium conduit 6 from the stage group $1^2$ to the compressor 2. A cooler 7 is incorporated in the working medium conduit 6. In each of the working medium conduits 4 and 5, there is a heater for the working medium, in the working medium conduit 5, this heater being a reactor 8, and in the working medium conduit 4, a surface heat exchanger 9. The circuit flow path for the heat receiving medium leading through the heat exchanger 9 is arranged upstream, and the circuit flow path leading through the reactor 8 is arranged downstream, of the turbine stage group $1^1$. The expansion stage consisting of turbine stage group $1^2$, on the other hand, is arranged downstream of the circuit flow path of the reactor 8.

On the heat supply side, the heat exchanger 9 lies in a flow connection 10, which branches off the part $5^2$ of the working medium conduit 5 leading away from the nuclear reactor 8, and opens into the part $5^1$ of the working medium conduit 5 leading to the nuclear reactor 8. Built into the flow connection 10 is a pumping device, namely a blower 11, driven by a motor 12, for returning a working medium partial stream through the flow connection 10 from the exist of the nuclear reactor 8 through the heat exchanger 9 arranged outside the reactor to the inlet of the nuclear reactor 8.

In this way it, is possible to use the nuclear reactor 8, through which the heat receiving working medium flows directly, as a source of heat for heating the working medium simultaneously at different pressure levels, without separate routes in the nuclear reactor being necessary. At the same time, the working medium in the heat exchanger 9 situated in the flow connection 10 may be heated to a temperature which is only slightly below the temperature possessed by the heated working medium of the gas turbine plant leaving the nuclear reactor directly. In the embodiment shown in FIG. 1, the heater exchanger 9, situated on the heat supply side in the flow connection 10, is arranged upstream of the nuclear reactor 8 in the direction of flow of the heat receiving working medium main stream flowing in the conduits 4, 5, 6. The nuclear reactor is therefore under low pressure.

The pumping device 11, 12 brings the branched-off working medium partial stream from the pressure prevailing in the working medium conduit $5^2$ to the pressure in the working medium conduit $5^1$, which pressure is higher by the pressure drop occurring in the nuclear reactor 8, and overcomes the resistance to flow in the flow connection 10 through the heat exchanger 9. The pumping device therefore, only has to supply a very small working power.

Figure 2:
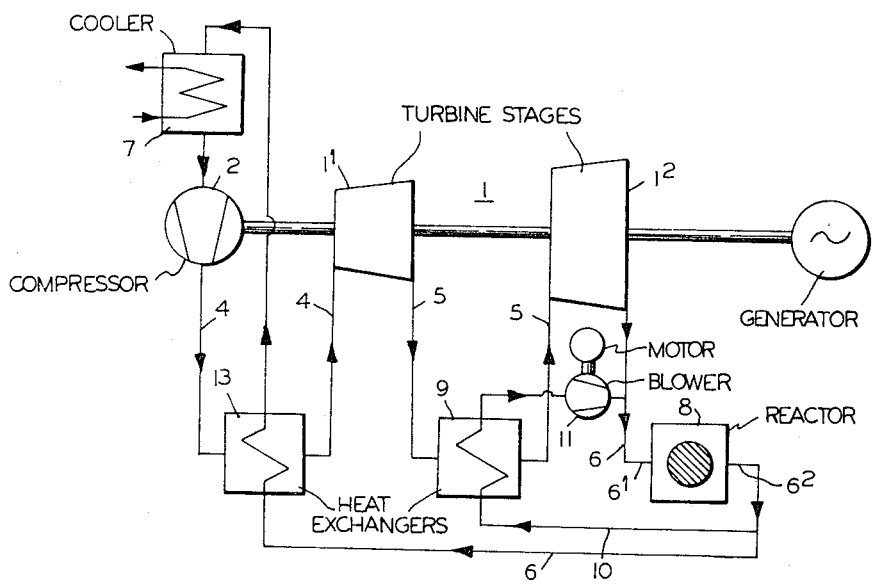

In the embodiment shown in FIG. 2, the nuclear reactor 8 lies in the working medium conduit 6 leading from the turbine stage group $1^2$ to the compressor 2. In this conduit are also the cooler 7 and a heat exchanger 13, in which the working medium heated in the nuclear reactor 8 gives off heat to the working medium flowing in the working medium conduit leading from the compressor 2 to the turbine stage group $1^1$. In the working medium conduit 5, leading from stage group $1^2$ to stage group $1^2$ lies the heat exchanger 9, which on the heat supply side lies in the flow connection 10, which branches off the working medium conduit $6^2$ leading away from the nuclear reactor 8, and opens into the working medium conduit $6^1$ leading to the nuclear reactor 8. The nuclear reactor 8 and the heat supply side of the heat exchangers 9 and 13 have working medium flowing through them at the lowest pressure of the gas turbine plant.

Figure 3:
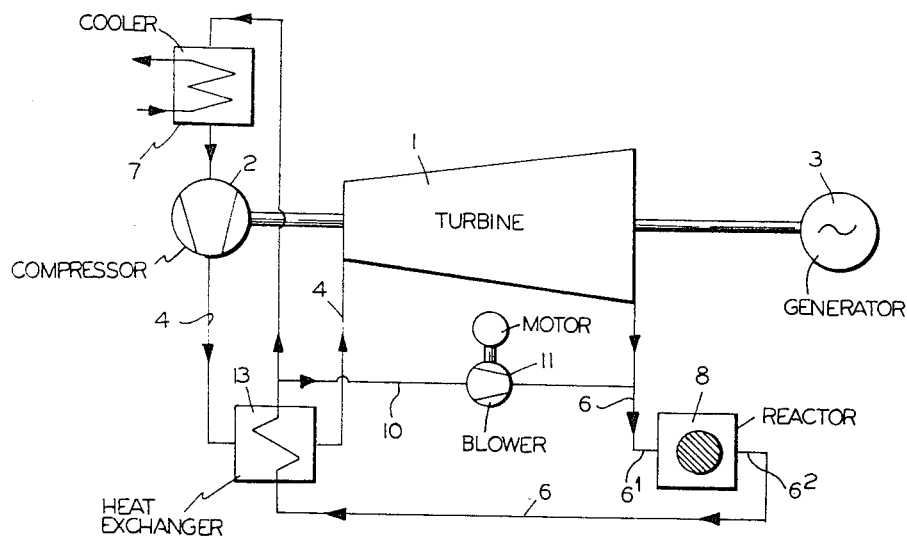

The gas turbine plant shown in FIG. 3 has a turbine 1 with a single stage group. The nuclear reactor 8 lies downstream of the turbine 1 in the working medium conduit 6, which leads from the turbine 1 to the compressor 2, and in which the cooler 7 and the heat exchanger 13 are again provided. Branching off the working medium conduit $6^2$ leading away from the nuclear reactor 8, at a point situated after the heat exchanger 13 in the direction of flow of the working medium, is a return conduit 10, which opens into the working medium conduit $6^1$, leading to the nuclear reactor 8, a blower 11 being again situated in the return conduit 10.

If the gas turbine plant has three or more heaters, each heater formed by a heat exchanger may be provided with its own branch of the flow connection leading from the exit of the nuclear reactor to the inlet of the nuclear reactor, or two or more heaters, connected in parallel or series, may be provided in such a return conduit.

Figure 4:
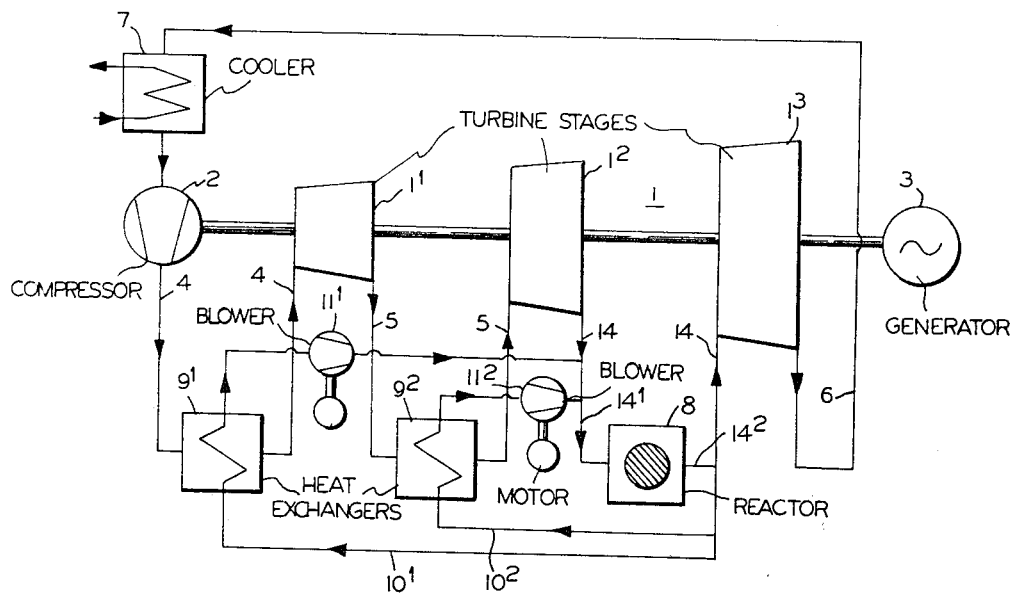

The gas turbine plant shown in FIG. 4 has three expansion stages consisting of the turbine stage groups $1^1$, $1^2$, $1^3$, upstream of each of which is a heater. In the working medium conduit 4, leading from the compressor 2 to the turbine group $1^1$, is situated a heat exchanger $9^1$, in the working medium conduit 5, leading from the turbine stage group $1^1$ to the stage group $1^2$, a heat exchanger $9^2$, and in the working medium conduit 14, leading from the stage group $1^2$ to the stage group $1^3$, is situated the nuclear reactor 8. On the heat supply side, the heat exchanger $9^1$ is situated in a return conduit $10^1$, the heat exchanger $9^2$ in a return conduit $10^2$. The return conduits $10^1$ and $10^2$ are branches of a flow connection issuing from the working medium conduit $14^2$ leading away from the nuclear reactor 8, and opening into the working medium conduit $14^1$, leading to the nuclear reactor 8, and are each provided with a blower $11^1$ and $11^2$, respectively. In both heat exchangers $9^1$, $9^2$, the working medium of the gas turbine can be heated to a temperature situated near the nuclear reactor outlet temperature.

Figure 5:
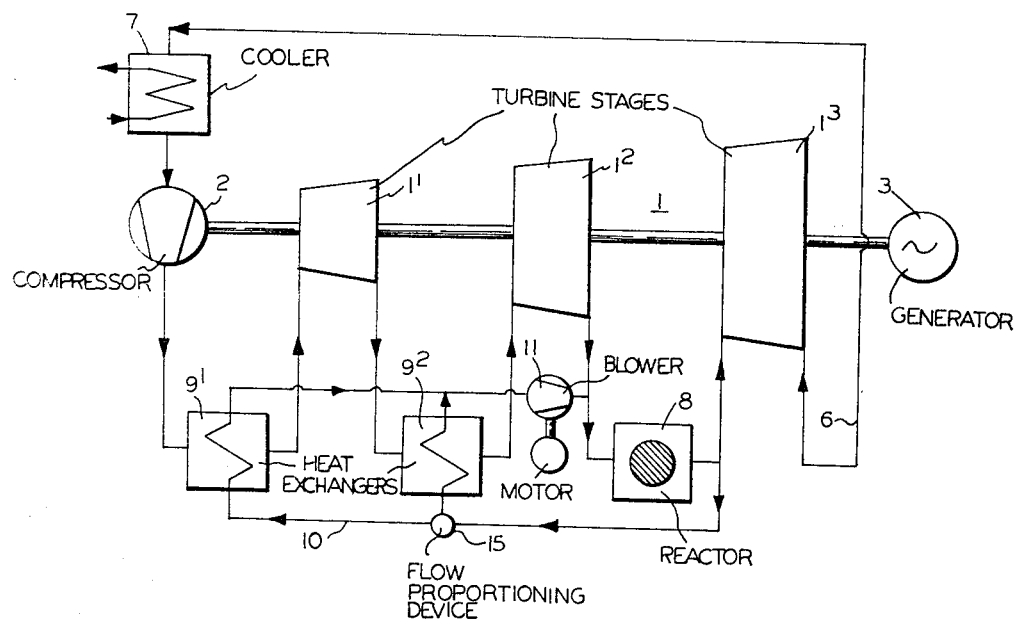

The plant shown in FIG. 5 differs from that shown in FIG. 4 in that the heat exchangers $9^1$ and $9^2$ lie in two parallel traversed branches of a common return conduit 10 having a single blower 11. At the branching point, a proportioning device 15 is provided, whereby the rate of flow of the working medium partial streams of the branches can be controlled.

The blowers 11, $11^1$, $11^2$ and their driving motors, and the proportioning device 15 are advantageously provided with regulating devices for regulating the quantity of the working medium partial streams flowing through the return conduits or through the heat exchangers, as that the heat given up in the heat exchangers to the working medium to be heated can be regulated.

In the constructional examples shown, the pumping devices 11, $11^1$, $11^2$ are in the form of circulating blowers and are driven by an electric motor 12. Without departing from the scope of the invention, they could, however, be driven by any other driving means such as an auxiliary turbine operated by the working medium of the gas turbine plant, and after passing through this auxiliary turbine, the working medium could flow back into the working cycle of the gas turbine plant again. The pumping device for the working medium partial current flowing in the return conduit could, however, also be a jet pump situated at the point at which the return conduit opens into the working medium conduit leading to the reactor, with the working medium coming from the main current of working medium as jet medium, or could be constructed as a pressure exchange device situated at the opening point.

At the compressor 2, intermediate cooling will advantageously be effected. For the transfer of heat from the working medium expanded in the turbine 1 to the working medium compressed in the compressor 2, heat exchangers will advantageously be provided which may be situated in the working medium conduits 4 and 6.

I claim:

1. In a nuclear thermal power plant including an atomic nuclear reactor and a closed circuit containing gaseous working medium which receives heat generated in the reactor, heating means for the transfer of said heat to the working medium, means for compressing the working medium, and means for expanding the heated working medium in at least one expansion stage while doing work, the improvement in which said heating means comprises a circuit flow path for expanded heat receiving working medium leading from the exit of the expansion stage to the compressing means through said reactor; a surface heat exchanger arranged outside the reactor; a second circuit flow path for compressed heat receiving working medium leading from the compressing means to the entrance of the expansion stage through said heat exchanger; and a flow connection, including pumping means, leading from the exit of the reactor flow path of the heat receiving working medium through said surface heat exchanger to the inlet of the reactor flow path so as to cause at least part of the working medium leaving the reactor flow path to give up heat to the heat receiving working medium flowing through the surface heat exchanger.

2. In a nuclear thermal power plant including an atomic nuclear reactor and a closed circuit containing gaseous working medium which receives heat generated in the reactor, heating means for the transfer of heat to the working medium, means for compressing the working medium, and means for expanding the heated working medium in at least two serially arranged expansion stages while doing work, the improvement in which said heating means comprises a first circuit flow path for expanded heat receiving working medium leading from the exit of an expansion stage to the compressing means through said reactor; a first surface heat exchanger arranged outside the reactor; a second circuit flow path for compressed heat receiving working medium leading from the compressing means to the entrance of an expansion stage through the first heat exchanger; at least one further heat exchanger arranged outside the reactor and having a circuit flow path for the heat receiving medium arranged downstream of and at the opposite side of an expansion stage from the second circuit flow path; and a flow connection, including pumping means and parallel branches through said heat exchangers, leading from the exit of the reactor flow path of the heat receiving working medium through said surface heat exchangers to the inlet of the reactor flow path so as to cause at least part of the working medium leaving the reactor flow path to give up heat to the working medium flowing through the second and third circuit flow paths.

3. The improvement defined in claim 2 in which each of said branches has its own pumping device.

4. The improvement defined in claim 2 in which said branches have a common pumping device and means are provided for the control of the rate of flow of the medium flowing through the branches.

5. In a nuclear thermal power plant including an atomic nuclear reactor and a closed circuit containing gaseous working medium which receives heat generated in the reactor, heating means for the transfer of heat to the working medium, means for compressing the working medium, and means for expanding the heated working medium in at least two serially arranged expansion stages while doing work, the improvement in which said heating means comprises a first circuit flow path for expanded heat receiving working medium leading from the exit of one expansion stage to the entrance of another expansion stage through said reactor; a surface heat exchanger arranged outside the reactor; a second circuit flow path for compressed heat receiving working medium leading from the compressing means to the entrance of an expansion stage through the heat exchanger; and a flow connection, including pumping means, leading from the exit of the reactor flow path of the heat receiving working medium through said surface heat exchanger so as to cause at least part of the working medium leaving the reactor flow path to give up heat to the heat receiving working medium flowing through the surface heat exchanger.

References Cited

UNITED STATES PATENTS

| | | | |
|---|---|---|---|
| 3,047,479 | 7/1962 | Young | 176—60 X |
| 3,152,962 | 10/1964 | Kagi | 176—60 X |
| 3,303,646 | 2/1967 | Southam | 60—59 X |

FOREIGN PATENTS

| | | |
|---|---|---|
| 1,133,401 | 7/1962 | Germany. |

EDGAR W. GEOGHEGAN, *Primary Examiner.*